United States Patent Office 3,408,355
Patented Oct. 29, 1968

3,408,355
THIAXANTHENE DERIVATIVES
Jany Renz and Jean-Pierre Bourquin, Basel, Conrad Bruschweiler, Birsfelden, Hans Winkler, Basel, and Gustav Schwarb, Neuallschwil, Switzerland, assignors to Sandoz Ltd. (also known as Sandoz A.G.), Basel, Switzerland
No Drawing. Filed Dec. 3, 1963, Ser. No. 327,836
Claims priority, application Switzerland, Dec. 7, 1962, 14,449/62; July 24, 1963, 9,199/63; Oct. 16, 1963, 12,650/63
6 Claims. (Cl. 260—293.4)

The present invention relates to new thiaxanthene derivatives, acid addition salts thereof and pharmaceutical compositions containing the same.

The present invention provides compounds of the formula:

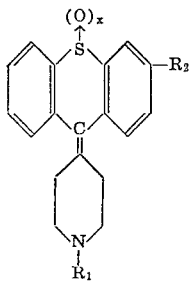

wherein $R_1$ is lower alkyl, $R_2$ is a member selected from the group consisting of hydrogen, halogen and lower alkoxy and $x$ is an integer selected from the group consisting of 1 and 2, their acid addition salts with organic and inorganic acids and pharmaceutical conmpositions comprising, in addition to an inert carrier, a said compound and/or its acid addition salt in a therapeutically effective amount.

The thiaxanthene derivatives of the Formula I are obtained by oxidizing a thiaxanthene derivative of the formula:

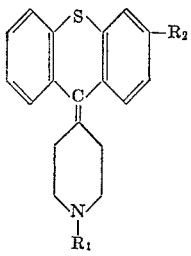

wherein $R_1$ and $R_2$ have the above significance.

In the starting materials of Formula II $R_1$ may denote the methyl, ethyl, propyl, isopropyl or butyl radical, $R_2$ a hydrogen atom, a chlorine or bromine atom, or a methoxy, ethoxy, propoxy, isopropoxy, n-butoxy or tert-butoxy radical.

The process of the invention may, for example, be carried out as follows:

When it is desired to produce an end product I in which $x$ denotes 1, an acid addition salt of a thiaxanthene derivative of Formula II is dissolved in a low molecular weight aliphatic alcohol, e.g. methanol, ethanol, or iso-propanol, and an aqueous solution of an alkali metal periodate, e.g. sodium or potassium periodate, is added dropwise to the solution at 0–20°. After a reaction period of several hours at 0–20°, the solvent is removed by evaporation in a vacuum and the aqueous residue is extracted with a water immiscible solvent, preferably chloroform. After removing the solvent, the end product may be isolated, purified and, if desired, converted into an acid addition salt by methods known pe se.

When it is desired to obtain an end product of Formula I, in which $x$ denotes 2, hydrogen peroxide is added to a solution of a thiaxanthene derivative in the form of the free base or of an acid addition salt in glacial acetic acid, after the addition of a catalytical quantity of a strong mineral acid, e.g. concentrated sulfuric acid, at room temperature or at an elevated temperature. After a reaction period of several hours at an elevated temperature, the mixture is concentrated in a partial vacuum and the residue taken up in water; ammonia or a caustic alkali solution is then added until an alkaline reaction to phenolphthalein is obtained, the resulting precipitated base taken up in a water immiscible solvent, preferably chloroform, and the solvent evaporated after having washed with water. The base may be crystallized as such and/or converted into salts with an organic or inorganic acid.

Generally, the thiaxanthene derivatives of Formula I are basic compounds which are crystalline at room temperature; with organic or inorganic acids they form crystalline salts which are stable at room temperature. Examples of acids which form suitable acid addition salts with the compounds I are: hydrochloric, hydrobromic, sulfuric, citric, tartaric, succinic, maleic, malic acetic, benzoic, hexahydrobenzoic, methanesulfonic, fumaric, gallic and hydriodic acid.

The new thiaxanthene derivatives of the present invention are suitable pharmaceuticals in view of their excellent pharmacodynamic properties. The compounds are characterized by a pronounced and very specific histamine inhibiting action and by the lack of undesirable side effects such as anticholinergic or sedative effects usually occurring in known antihistaminics. The compounds exert furthermore antiallergic, serotonin inhibiting, narcosis potentiating and adrenolytic effects. These valuable pharmacodynamic properties are expecially marked in the case of 9-(N-methyl-piperidylidene-4')-thiaxanthene-10-oxide and 3-chloro-9-(N-methyl-piperidylidene-4')-thiaxanthene-10-oxide. These properties of the compounds of Formula I are useful in the therapy for antihistaminics and antiallergics, e.g. for the treatment of *Rhinitis allergica*, *Asthma bronchiale* or *Status asthmaticus;* these properties are also useful in sedatives and neuroleptics for the treatment of psychic illnesses.

The compounds are also useful as intermediates in the preparation of other useful medicaments.

The present invention further provides pharmaceutical compositions containing, in addition to a physiologically acceptable inert carrier, a Compound I above and/or an acid addition salt thereof.

The compounds of the present invention are combined with physiologically acceptable, non-toxic, inert carriers for the purpose of making them suitable for administration, e.g., enterally or parenterally. In order to produce such medicinal preparations, the compounds of the invention are worked up with inorganic or organic adjuvants which are physiologically acceptable and inert. Examples of such adjuvants or carriers for various medicinal preparations are as follows:

(1) Tablets and dragees: Lactose, starch, talc and stearic acid.

(2) Syrups: Solutions of cane sugar, invert sugar and glucose.
(3) Injectable solutions: Water, physiologically acceptable alcohols, glycerine and physiologically acceptable vegetable fats.
(4) Suppositories: Physiologically acceptable, natural or hardened oils and waxes.
(5) Ointments, suspensions and emulsions: Inorganic and organic, lipophilic or hydrophilic compounds, paraffin, alginates, cellulose derivatives, polyoxyethylene derivatives, bentonite and petroleum jelly.

The preparation may contain suitable preserving, stabilizing or wetting agents, solubilizers, sweetening and colouring substances or flavorings, with the proviso that they must be physiologically acceptable.

In the following non-limitative examples all temperatures are indicated in degrees centigrade and are corrected.

Example 1.—9-(N-methyl-piperidylidene-4')-thiaxanthene-10-oxide

A solution of 31.4 g. of sodium periodate in 350 cc. of water is added dropwise to a solution of 50.0 g. of 9-(N - methyl - piperidylidene - 4') - thiaxanthene - hydrochloride - 1,5 - hydrate (melting point 162–165° from water) in 500 cc. of methanol at +5° over a period of 45 minutes and whilst stirring. To complete the reaction the mixture is stirred for 2 hours at +5° and then for 15 hours at room temperature. The reaction mixture is then concentrated in a partial vacuum until no more methanol distills off. Subsequently 75 cc. of 3 N ammonia are added to the concentrated solution until a phenolphthalein alkaline reaction is obtained and the precipitated base extracted with 250 cc. of chloroform. After washing the chloroform layer with 100 cc. of water and drying over potassium carbonate, the solution is concentrated. After recrystallizing the evaporation residue twice, each time with 500 cc. of ethyl acetate, the pure 9-(N-methyl-piperidylidene - 4') - thiaxanthene - 10 - oxide results, having a melting point of 218–220°.

Example 2.—3-chloro-9-(N-methyl-piperidylidene-4')-thiaxanthene-10-oxide

A solution of 6.85 g. of sodium periodate in 75 cc. of water is added dropwise to a solution of 10.0 g. of 3-chloro - 9 - (N - methyl-piperidylidene-4')-thiaxanthene (melting point 141–143° from acetone) in 2.63 g. of concentrated hydrochloric acid and 200 cc. of methanol whilst stirring at +5° over a period of 45 minutes. To complete the reaction the mixture is stirred for 2 hours at +5° and then for 15 hours at room temperature. The reaction mixture is subsequently concentrated in a partial vacuum until no more methanol distills off. 25 cc. of 3 N ammonia are added to the concentrated solution until a phenolphthalein alkaline reaction is obtained and the precipitated base extracted with 100 cc. of chloroform. After washing the chloroform layer with 30 cc. of water and drying over potassium carbonate, the solution is concentrated. After recrystallizing the evaporation residue twice, each time with 200 cc. of ethyl acetate, the pure 3 - chloro - 9 - (N - methyl - piperidylidene - 4') - thiaxanthene - 10 - oxide results, having a melting point of 174–176°.

Example 3.—9-N-methyl-piperidylidene-4')-thiaxanthene-10-dioxide

A solution of 43.5 cc. of hydrogen peroxide (40%) and 50 cc. of glacial acetic acid is added dropwise to a 60° hot mixture of 50.0 g. of 9-(N-methyl-piperidylidene-4')-thiaxanthene (melting point 120–120.5° from ligroin), 500 cc. of glacial acetic acid and 20 cc. of concentrated sulphuric acid over a period of 30 minutes and the mixture stirred for a further 17 hours at 60°. The reaction mixture is then concentrated in a vacuum, the residue dissolved in 500 cc. of water, conentrated ammonia added to the solution until a phenolphthalein alkaline reaction is obtained, and the precipitated base extracted with 400 cc. of chloroform. After washing the chloroform solution with 100 cc. of water and drying over potassium carbonate, the solution is concentrated. After crystallizing three times from ethanol the pure 9-(N-methyl-piperidylidene-4')-thiaxanthene-10-dioxide is obtained, having a constant melting point of 247–249°.

Example 4.—3-methoxy-9-(N-methyl-piperidylidene-4')-thiaxanthene-10-oxide

A solution of 11.1 g. of sodium periodate in 100 cc. of water is added dropwise to a solution of 16.0 g. of 3 - methoxy - 9 - (N - methyl - piperidylidene - 4') - thiaxanthene (melting point 172–174° from acetone) in 5.27 g. of concentrated hydrochloric acid and 600 cc. of methanol whilst stirring at +5° over a period of 45 minutes. To complete the reaction the mixture is stirred for two hours at +5° and then for 15 hours at room temperature. The reaction mixture is then concentrated in a partial vacuum ntil no more methanol distills off. 35 cc. of 3 N ammonia are added to the concentrated solution until a phenolphthalein alkaline reaction is obtained and the precipitated base extracted with 150 cc. of chloroform. After washing the chloroform layer with 50 cc. of water and drying over potassium carbonate, the solution is concentrated. After crystallizing the evaporation residue twice, each time with 120 cc. of absolute ethanol, the pure 3 - methoxy - 9 - (N - methyl - piperidylidene - 4') - thiaxanthene-10-oxide is obtained, having a melting point of 181–183°.

Example 5.—3 - bromo - 9 - (N - methyl - piperidylidene-4'-thiaxanthene-10-oxide A solution of 4.13 g. of sodium periodate in 40 cc. of water is added dropwise to a solution of 6.85 g. of 3-bromo - 9 - (N - methyl - piperidylidene - 4') - thiaxanthene (melting point 145–147° from ethyl acetate) in 1.95 g. of concentrated hydrochloric acid and 150 cc. of methanol whilst stirring at +5° over a period of 45 minutes. To complete the reaction the mixture is stirred for two hours at +5° and then for 15 hours at room temperature. The reaction mixture is subsequently concentrated in a partial vacuum until no more methanol distills off. 30 cc. of 3 N ammonia are added to the concentrated solution until a phenolphthalein alkaline reaction is obtained and the precipitated base extracted with 75 cc. of chloroform. After washing the chloroform layer with 25 cc. of water and drying over potassium carbonate, the solution is concentrated. After crystallizing the evaporation residue twice, each time with 100 cc. of absolute ethanol, the pure 3-bromo-9-(N-methyl-piperidylidene-4')-thiaxanthene - 10 - oxide is obtained, having a melting point of 194–196°.

The citrate is produced by adding the hot solution of 4.7 g. of the free base in 40 cc. of absolute ethanol to the solution of 2.56 g. of citric acid in 20 cc. of absolute ethanol and cooling well. After crystallizing the salt from 65 cc. of 90% ethanol, the pure 3-bromo-9-(N-methylpiperidylidene-4')-thiaxanthene-10-oxide citrate is obtained, having a melting point of 178–180° (decomposition).

The 3 - bromo - 9 - (N - methyl - piperidylidene - 4') - thiaxanthene used as starting material is produced as follows: 3 - bromo - thiaxanthone, having a melting point of 165°, is reacted with N - methyl - 4 - chloro - piperidine in tetrahydrofuran according to the Grignard method, the reaction product hydrolyzed and the resulting 3 - bromo - 9 - (N - methyl - piperidyl - 4') - thiaxanthenol-(9) [melting point 202–204° from ethyl acetate] heated to 110° for 1½ hour with the 2½-fold quantity per volume of concentrated hydrochloric acid in order to split off water. The 3-bromo-9-(N-methyl-piperidylidene-4')-thiaxanthene melts at 145–147° after crystallization from ethyl acetate.

What is claimed is:
1. A thiaxanthene derivative of the formula:

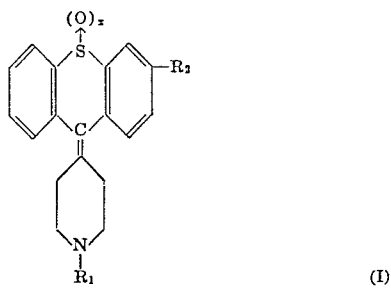 (I)

wherein $R_1$ is lower alkyl, $R_2$ is a member selected from the group consisting of hydrogen, halogen and lower alkoxy, $x$ is an integer selected from the group consisting of 1 and 2, and acid addition salts thereof with an acid selected from the group consisting of hydrochloric acid, hydrobromic acid, sulfuric acid, fumaric acid, maleic acid, malic acid, acetic acid and citric acid.

2. 9 - (N - methyl - piperidylidene - 4') - thiaxanthene - 10-oxide.

3. 3 - chloro - 9 - (N - methyl - piperidylidene - 4') - thiaxanthene-10-oxide.

4. 9 - (N - methyl - piperidylidene - 4') - thiaxanthene - 10-dioxide.

5. 3 - methoxy - 9 - (N - methyl - piperidylidene - 4') - thiaxanthene-10-oxide.

6. 3 - bromo - 9 - (N - methyl - piperidylidene - 4') - thiaxanthene-10-oxide.

References Cited

UNITED STATES PATENTS

| | | | |
|---|---|---|---|
| 2,629,719 | 2/1953 | Cusic | 260—293.44 |
| 2,684,372 | 7/1954 | Amstutz | 260—328 |
| 3,047,580 | 6/1962 | Sprague | 260—293.44 |
| 3,055,903 | 9/1962 | Renz et al. | 260—293.44 |
| 3,107,242 | 10/1963 | Craig | 260—243 |
| 3,275,640 | 9/1966 | Engelhardt | 260—293.44 |

OTHER REFERENCES

Winthrop et al., J. Org. Chem., vol. 27, p. 230–240 (1962).

Bibliographia Tabulae, ENDZ, December 1962, published by Sandoz.

Schindle et al., Helv. Chem. Acta, vol. 46, pp. 1097–1108, June 1963.

HENRY R. JILES, *Primary Examiner.*

A. V. SPEVACK, *Assistant Examiner.*